United States Patent
Galomb

(10) Patent No.: US 9,211,670 B1
(45) Date of Patent: Dec. 15, 2015

(54) SUPPORT APPARATUS FOR INJECTION TUBE ASSEMBLY

(71) Applicant: David E Galomb, Allentown, PA (US)

(72) Inventor: David E Galomb, Allentown, PA (US)

(73) Assignee: GALOMB, INC., Allentown, PA (US)

( * ) Notice: Subject to any disclaimer, the term of this patent is extended or adjusted under 35 U.S.C. 154(b) by 0 days.

(21) Appl. No.: 14/201,794

(22) Filed: Mar. 8, 2014

Related U.S. Application Data

(60) Provisional application No. 61/776,758, filed on Mar. 11, 2013, provisional application No. 61/776,765, filed on Mar. 11, 2013, provisional application No. 61/776,767, filed on Mar. 11, 2013, provisional application No. 61/777,500, filed on Mar. 12, 2013, provisional application No. 61/801,888, filed on Mar. 15, 2013.

(51) Int. Cl.
  *B29C 45/03* (2006.01)
  *B29C 45/74* (2006.01)
  *B29C 45/46* (2006.01)
  *B29C 45/78* (2006.01)
  *B29C 45/73* (2006.01)

(52) U.S. Cl.
  CPC ................ *B29C 45/74* (2013.01); *B29C 45/46* (2013.01); *B29C 45/78* (2013.01); *B29C 45/03* (2013.01); *B29C 45/7312* (2013.01)

(58) Field of Classification Search
  CPC ............................ B29C 45/7312; B29C 45/03
  USPC ......... 425/542, 547, 549, 574, 575, 583, 589, 425/DIG. 57
  See application file for complete search history.

(56) References Cited

U.S. PATENT DOCUMENTS 6,017,209 A * 1/2000 Gellert et al. ................. 425/549
7,494,332 B2 * 2/2009 Galomb ........................ 425/574

OTHER PUBLICATIONS

Commercial Literature: The "Mini-Compounder KETSE 12/36" manufactured and sold by C.W. Brabender® Instruments, Inc. located in South Hackensack, New Jersey, USA.
Commercial Literature: The "LME Laboratory Mixing Extruder" manufactured and sold by Dynisco, located in Franklin, Massachusetts, USA.
Commercial Literature: The "LMM Laboratory Mixing Molder" manufactured and sold by Dynisco, located in Franklin, Massachusetts, USA.
Commercial Literature: The "RCP-0250 Microtruder" manufactured and sold by Randcastle Extrusion Systems, Inc., located in Cedar Grove, New Jersey, USA.

(Continued)

*Primary Examiner* — Tim Heitbrink

(57) ABSTRACT

A support apparatus that removably secures an injection tube assembly in a vertical orientation, and controls its temperature when secured therein. The apparatus facilitates the mixing of materials contained in the injection tube portion of the assembly. In one embodiment the apparatus cooperates with a material stripping apparatus that strips off material residue from an external mixing element as it is being withdrawn from the injection tube. In another embodiment, it cooperates with a mixing tool with an integrated stripping element. The tool both mixes the material in the tube and then strips the material residue off its embodied mixing element as it is being withdrawn from the tube. If desired, the apparatus may also be employed in cooperation with an injection molding apparatus to produce an injection molded part with the now mixed material. Alternative embodiments and other advantages are also disclosed.

18 Claims, 4 Drawing Sheets

(56) References Cited

OTHER PUBLICATIONS

Commercial Literature: The "DSM Xplore 5ml Micro-compounder" manufactured and sold by DSM Xplore located in the Netherlands.
Commercial Literature: The "DSM Xplore Micro Injection Moulding Machine" manufactured and sold by DSM Xplore located in the Netherlands.
Commercial Literature: The "MicroInjector" manufactured and sold by DACA Systems located in Goleta, California, USA.
Commercial Literature: The "Microcompounder" manufactured and sold by DACA Systems located in Goleta, California, USA.
Commercial Literature: The "Thermo Scientific Haake MiniLab II Micro-Compounder" manufactured and sold by Thermo Scientific, located in Waltham, Massachusetts.
Academic paper entitled: "Improving Polymer Blend Dispersions in Mini-mixers" by Milan Maric and Christopher W. Macosko. Published in Polymer Engineering and Science, Jan. 2001, vol. 41 No. 1.
Academic paper entitled: "A Novel Miniature Mixing Device for Polymeric Blends and Compounds" by Martin Sentmanat, Savvas G. Hatzikiriakos, and Christos Stamboulides. Published by Polymer Engineering and Science 2009 vol. 49 Issue 11.

* cited by examiner

SUPPORT APPARATUS FOR INJECTION TUBE ASSEMBLY

CROSS-REFERENCE TO RELATED APPLICATIONS

This application claims priority under 35 U.S. Code §119 of U.S. Provisional Application Ser. Nos. 61/776,758 and 61/776,765 and 61/776,767 all filed on Mar. 11, 2013, and 61/777,500 filed on Mar. 12, 2013, and 61/801,888 filed on Mar. 15, 2013, all of which are hereby incorporated by reference in their respective entireties.

This application is also related to co-pending U.S. Non-Provisional applications entitled: Material Stripping Apparatus for External Mixing Element; Mixing Tool with Integrated Material Stripping Element; System and Method for Mixing Polymers and Producing an Injection Molded Part; Injection Tube Assembly with Integrated Material Stripping Element and a Polymer Mixing System for Employing the Same, all filed on the same day as this U.S. Non-Provisional application, and all hereby incorporated by reference in their respective entireties.

FIELD

The field relates generally to laboratory size apparatuses and systems used for melting, mixing, and processing polymers, and more particularly to a support apparatus that removably secures an injection tube assembly.

BACKGROUND

Polymers are often distinguished from other materials because they tend to have special challenges when mixing them, such as having to be melted at relatively high temperatures before they can be mixed, and often being very viscous and sticky in their molten state. Most polymers also have a narrow window in time to complete the mixing operation at the elevated temperature before they begin to degrade.

By and large polymers (e.g. thermoplastics) are mixed commercially via what is commonly referred to as continuous processing equipment, such as production type extruders and injection molding machines. Whereby the desired polymer is continually fed into such machines, usually along with some other additive, such as a colorant or filler, where it is melted and mixed with the said additive during the process of forming it into a desired shape, such as a plastic injected molded part, or an extruded profile.

These systems and machines work well for producing many parts very quickly, but are typically large in size, weighing thousands of pounds, and require extensive set-up time and rigorous process control to operate, and are very expensive.

These attributes also make them very difficult and inconvenient to use if one wishes to make just one part or a few parts for evaluation or testing purposes. Testing and evaluating a polymer before attempting to use it commercially in a product is almost always a prerequisite, so regardless of the cost and inconvenience, it is usually done. Additionally, scientists and researchers are greatly hindered in their attempts to quickly develop and test new polymer formulations and mixtures when they are forced to use these large production machines to melt, mix and mold their test samples.

There are companies who have attempted to address this problem with varying degrees of success. Some have created essentially mini versions of production line equipment allowing it to be used in a laboratory environment to melt and mix the polymers and then either extrude the mixed material into a desired profile or form it into an injection molded part. Others have created stand alone machines and devices, also suitable for use in a laboratory environment to melt and mix a desired polymer, and then expel it in molten form, so the user can evaluate the mixed material. Although the line between a stand-alone melt and mixing machine and a mini-production system is somewhat blurred because some systems are comprised of multiple machines or apparatuses that are either used in cooperation with each other or attached together as add-on pieces of equipment for further downline processing of the mixed molten polymer.

Some equipment and systems known to the applicant for melting, mixing and processing polymers on a laboratory scale are as follows:

The "Mini-Compounder KETSE 12/36" manufactured and sold by C. W. Brabender® Instruments, Inc. located in South Hackensack, N.J., USA The "LME Laboratory Mixing Extruder" manufactured and sold by Dynisco, located in Franklin, Mass., USA The "LMM Laboratory Mixing Molder" manufactured and sold by Dynisco, located in Franklin, Mass., USA The "RCP-0250 Microtruder" manufactured and sold by Randcastle Extrusion Systems, Inc., located in Cedar Grove, N.J., USA The "DSM Xplore 5 ml Micro-compounder" manufactured and sold by DSM Xplore located in the Netherlands.

The "DSM Xplore Micro Injection Moulding Machine" manufactured and sold by DSM Xplore located in the Netherlands.

The "MicroInjector" manufactured and sold by DACA Systems located in Goleta, Calif., USA.

The "Microcompounder" manufactured and sold by DACA Systems located in Goleta, Calif., USA.

The "Thermo Scientific Haake MiniLab II Micro-Compounder" manufactured and sold by Thermo Scientific, located in Waltham, Mass.

Also known is an academic paper (published in Polymer Engineering and Science, January 2001, Vol. 41 No. 1) entitled: "Improving Polymer Blend Dispersions in Mini-mixers" by Milan Maric and Christopher W. Macosko. The researchers in that study evaluated several different laboratory size polymer mixing systems and machines on the market and compared them against each other, noting some of the shortcomings of each.

Although the apparatuses and systems on the market today may be suitable for their intended purposes, they all fall short of most users' desires in some way. The mini-production line systems are still very expensive and still require a significant amount of process control to operate. They are also cumbersome to clean and maintain and take up a lot of laboratory space. The stand-alone machines are also expensive and although smaller, they are also difficult to clean and maintain, plus they carry additional limitations and drawbacks, such as in some cases producing inferior mixing quality.

In any case, it is clearly evident there still remains a great unmet need for a simpler, more affordable, easier to operate, easier to clean and maintain, versatile, robust system that can melt, mix and process polymers in a laboratory environment with consistent high quality. What is disclosed hereafter is the answer to that great unmet need.

SUMMARY

A support apparatus that removably secures a predetermined vessel, preferably an injection tube assembly, in a desired orientation, namely vertically, as well as controls the temperature of said assembly when it's secured in the apparatus. The apparatus facilitates the mixing of materials, preferably polymers, contained in the injection tube portion of the assembly. In one embodiment the apparatus cooperates with a material stripping apparatus that is positioned in close proximity to the support apparatus. A repositionable portion of the stripping apparatus is placed over the opening of the injection tube in close communication therewith before inserting an external mixing element to mix the material inside. The mixing element is then inserted first through the material stripping apparatus and then into the tube to mix the material. After the mixing operation is complete, the mixing element is withdrawn from the tube, and the material residue is stripped from it as it withdraws back through the material stripping apparatus, leaving substantially all of the residue inside the said tube. In another embodiment, the support apparatus cooperates with a mixing tool comprising an integrated material stripping element. The said tool both mixes the material in the injection tube and strips off the residue from its embodied mixing element as it is being withdrawn therefrom, leaving substantially all of the residue inside the said tube. If desired, the apparatus in either embodiment may also be employed in cooperation with an injection molding apparatus to produce an injection molded part with the now mixed material. Alternative embodiments and other advantages are also disclosed.

DETAILED DESCRIPTION

Overview

It will first be described how the apparatus may be constructed according to one exemplary embodiment (A), and then another exemplary embodiment (B). Then it will be described how the apparatus operates. Then, some advantages of the apparatus and its intended purpose and will be described. Then, some alternative embodiments will be described.

Support Apparatus

Embodiment A

Figure 1:
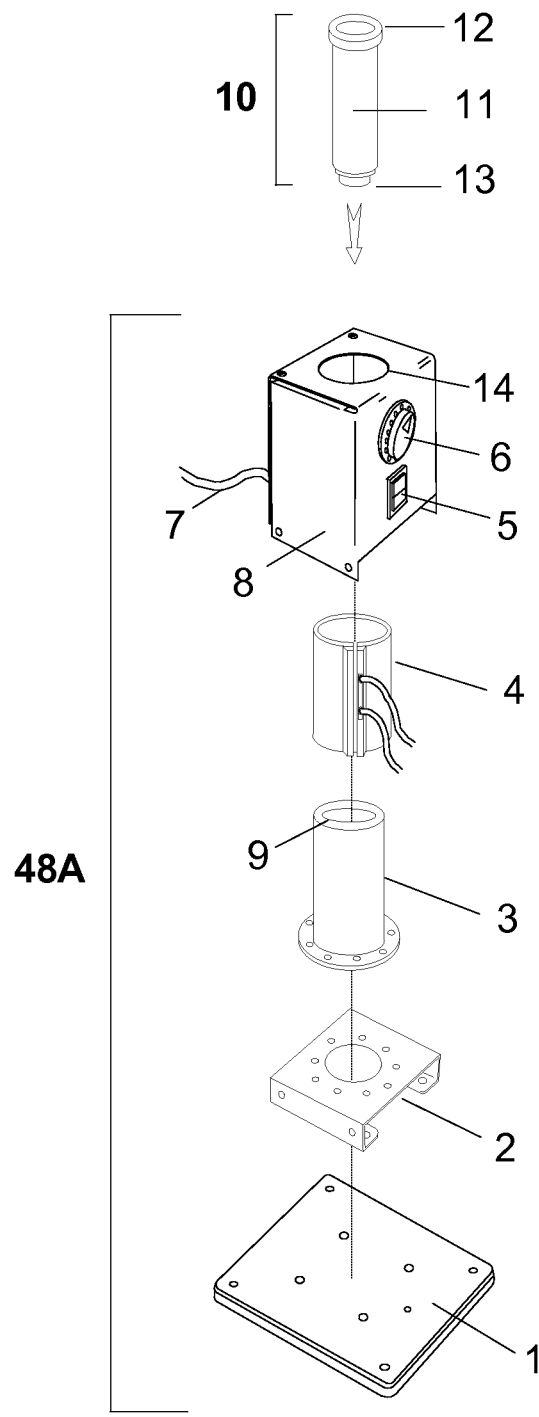
FIG. 1 illustrates an exploded isometric view of a support apparatus in embodiment A.

In one embodiment, as represented by FIG. 1, a support apparatus 48A is depicted in an exploded isometric view comprising: a base plate 1; a mounting platform 2; a receiving block 3; a heating element 4; a power switch 5; a thermostat 6; a power cord 7; a protective enclosure 8.

The base plate 1 is constructed of metal, and may comprise various holes, studs and/or machined surfaces to accommodate the attachment of other components of the apparatus 48A, as well as to facilitate securing the apparatus 48A to a workbench or similar surface after it is assembled.

The mounting platform 2 is constructed of metal, and may comprise various holes, studs and/or machined surfaces to accommodate the attachment of other components of the apparatus 48A. The said platform 2 secures to the base plate 1 with bolts or screws, and is shaped in such a manner that a portion of it stands off from the base plate 1 when mounted thereto.

The receiving block 3 is constructed from metal and may comprise various holes, studs and/or machined surfaces to accommodate the attachment of other components of the apparatus 48A. In this embodiment, the said block 3 is characterized by a receiving hole 9 machined into its top surface and extending vertically through the entire block 3.

In this embodiment, the base plate 1, the platform 2 and the receiving block 3 in combination comprise the support structure of the apparatus 48A, and the said block 3 is constructed to accommodate the insertion of an injection tube assembly 10 from above.

The said assembly 10 comprises a hollow cylindrical tube 11 with a lip 12 or similar flange surrounding its top periphery, and a nozzle 13 with an orifice, inserted into the bottom opening of the said tube 11, and secured therein. The said top and bottom references refer to when the said injection tube assembly 10 is vertically oriented.

It shall be appreciated; construction of both the receiving block 3 and the injection tube assembly 10 according to this embodiment are not a limitation, and alternative constructions of both will be described later.

The heating element 4 is a band type heater that slides over the receiving block 3 and is mechanically held in close communication with the outside surface of the said block 3, typically with screws or a clamp.

The thermostat 6 inserts into a die-cut hole in the protective enclosure 8 and is secured therein with screws. The said thermostat 6 has an integrated temperature sensing means (not shown) that is secured to or otherwise positioned in close communication with the receiving block 3 to accurately monitor its temperature.

The power switch 5 snap-fits into a die-cut hole in the protective enclosure 8. The thermostat 6, heating element 4, and power switch 5 are electrically connected to each other by wires (not shown), and to the power cord 7, which extends from the apparatus 48A to an external power source.

When the power switch 5 is turned on, the thermostat 6 responds to the output of its integrated sensing means by controlling the amount of electrical current extending to the heating element 4, thereby controlling the temperature of the receiving block 3.

The protective enclosure 8 secures to the mounting platform 2 with screws, and when attached, substantially surrounds the receiving block 3, except for a die-cut hole 14 in its top surface, exposing the receiving hole 9 in the block 3. The Apparatus 48A is now constructed.

Support Apparatus

Embodiment B

Figure 2:
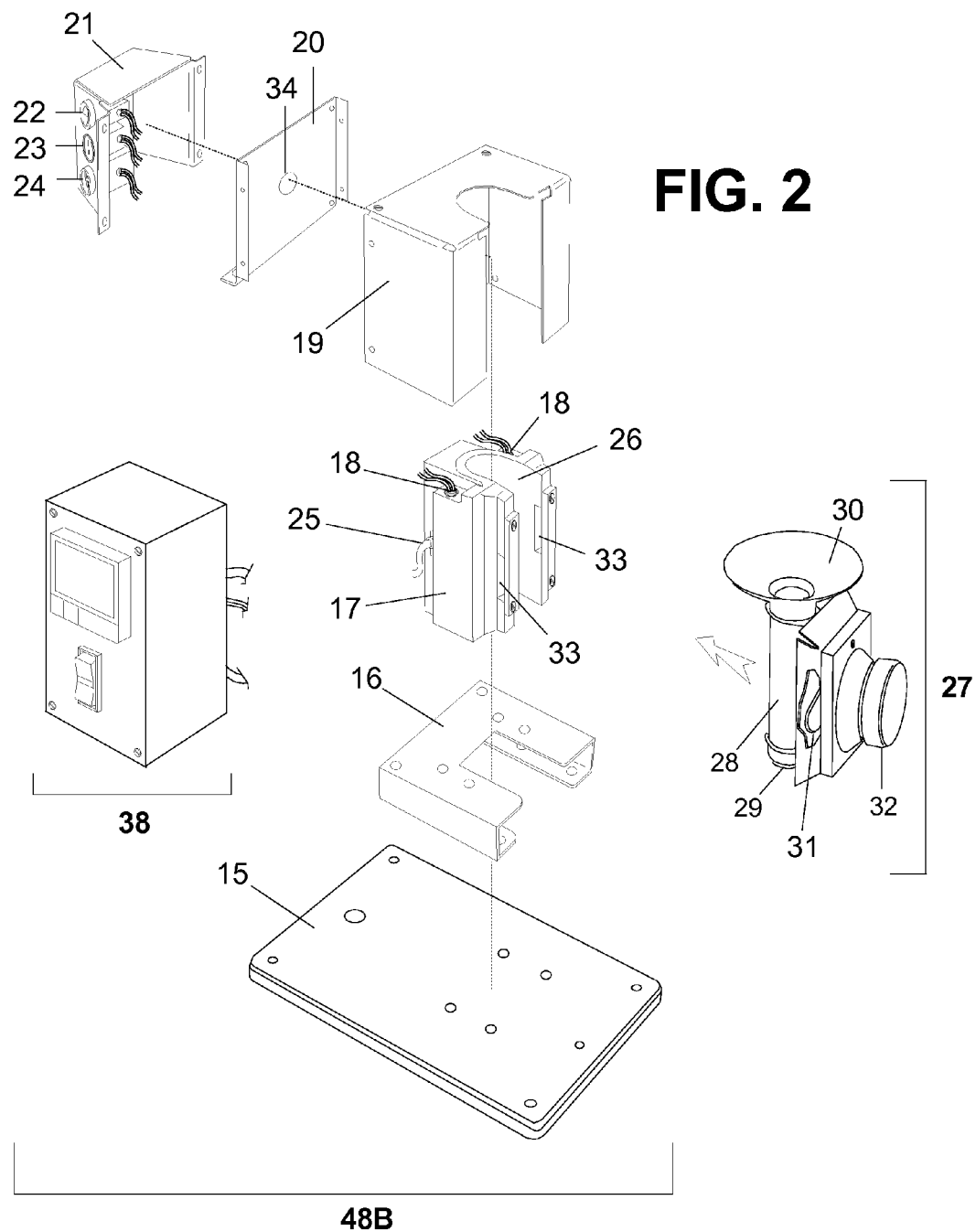
FIG. 2 illustrates an exploded isometric view of a support apparatus in embodiment B.

In another embodiment, as represented by FIG. 2, a support apparatus 48B is depicted in an exploded isometric view comprising: a base plate 15; a mounting platform 16; a receiving block 17; two heating elements 18; a protective enclosure 19; a back wall support 20; protective shroud 21; a power switch 22; a sensor wire input receptacle 23; a power input receptacle 24; a thermocouple sensor 25, and an electronic control device (ECD) 38.

The base plate 15 is constructed of metal, and may comprise various holes, studs and/or machined surfaces to accommodate the attachment of other components of the apparatus 48B, as well as to facilitate securing the apparatus 48B to a workbench or other desired surface after it is assembled.

The mounting platform 16 is constructed of metal, and may comprise various holes, studs and/or machined surfaces to accommodate the attachment of other components of the apparatus 48B. The said platform 16 is secured to the base plate 15 with bolts or screws, and is shaped in such a manner that a portion of it stands off from the base plate 15 when mounted thereto.

The receiving block 17 is constructed from metal and may comprise various holes, studs and/or machined surfaces to accommodate the attachment and/or insertion of other components of the apparatus 48. The block 17 is secured to the platform 16 with screws and is characterized by a receiving slot 26, preferably machined into its front surface, as illustrated in FIG. 2.

In this embodiment, the base plate 15, the mounting platform 16 and the receiving block 17 in combination comprise the support structure of the apparatus 48B, and the said block 17 is constructed to accommodate the insertion of a vertically oriented injection tube assembly 27, which in this embodiment comprises: a hollow cylindrical tube 28; a nozzle 29 with an orifice, inserted into the bottom opening of the said tube 28 and secured therein; a funnel tray 30; a latching mechanism 31 (cutaway view); and a knob 32 or similar means suitable for gripping by the user.

It shall be appreciated; like embodiment (A) constructing the receiving block 17 and the injection tube assembly 27 according to this embodiment (B) is also not a limitation.

Two notches 33 machined into the receiving block 17 accommodate receipt of the latching mechanism 31 integrated into the injection tube assembly 27, such that when the said assembly 27 is inserted into to the receiving slot 26 and the knob 32 is turned in one direction, the latching mechanism 31 rotates, causing the block 17 and the assembly 27 become interlocked with each other. Turning the knob 32 in the opposite direction rotates the latching mechanism 31 in the opposite direction, releasing the interlock and allowing the said assembly 27 to be removed from the slot 26 of the block 17.

The two heating elements 18, which in this embodiment are cartridge type heaters, insert into two machined holes in the top surface of the receiving block 17 in close proximity to the receiving slot 26.

The back wall support 20 is constructed from metal and may comprise various holes, studs and/or machined surfaces to accommodate the attachment and/or insertion of other components of the apparatus 48B. The said support 20 has a vertical portion that functions as the back wall, a bottom flange that secures to the mounting platform 16 with bolts and two side flanges that secure to the protective enclosure 19 with screws.

The thermocouple sensor 25 secures to the receiving block 17 with screws, and is electrically connected to the sensor wire receptacle 23, typically with two sensor wires (not shown) that feed through a hole 34 in the back wall support 20. The sensor wire receptacle 23 secures to the protective shroud 21 with a nut.

The power switch 22, which in this embodiment also functions as a circuit breaker, snap-fits into a die-cut hole in the protective shroud 21. The power input receptacle 24 attaches to the shroud 21 with screws and nuts, and a ground wire (not shown) extends from the said receptacle 24 to the back wall support 20, and is secured thereto with a screw.

The power switch 22, power input receptacle 24, and two heating elements 18 are electrically connected to each other by means of wires and connectors (not shown), and the protective shroud 21 is secured to the back wall support 20 with screws. The electronic control device (ECD) 38 is then electrically integrated, which will be explained in more detail later, completing the assembly of the apparatus 48B.

Operating the Apparatus

Figure 3:
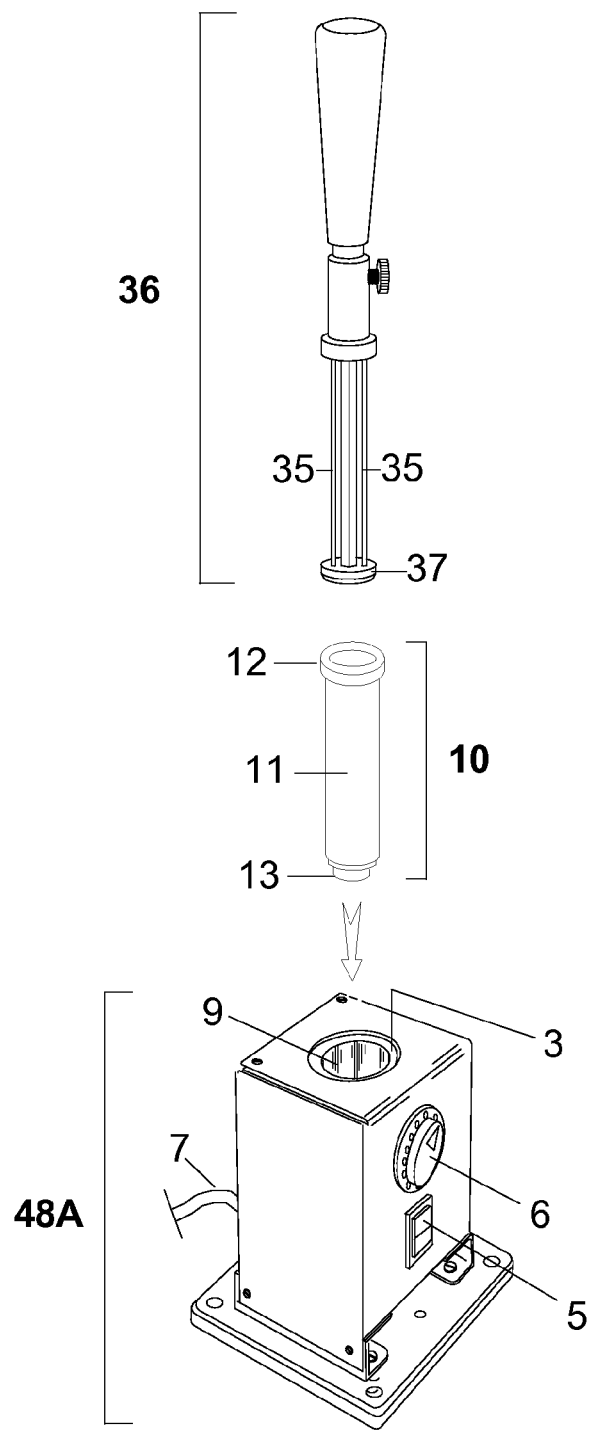
FIG. 3 illustrates an assembled isometric view of a support apparatus in embodiment A.

FIG. 3 Illustrates an assembled isometric view of the support apparatus 48A when constructed according to Embodiment A. The basic procedure of operating the apparatus 48A is to plug the power cord 7 into a conventional electrical outlet. Then turn on the power switch 5. Then set the thermostat 6 to a desired temperature, which would typically be whatever temperature is necessary to allow the selected materials to be mixed together.

Once the proper temperature is set, the injection tube assembly 10 is inserted into the receiving hole 9 of the receiving block 3 until the lip 12 of the injection tube 11 makes contact with the top surface of the block 3, thus preventing the assembly from falling through the said block 3. If desired, the said assembly 10 may also comprise a notch, nib, or other feature (not shown) that prevents the tube 11 from rotating while it is inserted in the receiving hole 9. Likewise the support apparatus 48A may comprise a similar means (not shown) to catch or clip or otherwise keep the injection tube assembly 10 secured in place while it's inserted in the receiving hole 9. A desired material or materials are then placed inside the injection tube 11, typically just by pouring them in by hand. When the materials are sufficiently melted, a desired mixing element 35 of an external mixing tool 36 is inserted into the tube 11 to agitate the materials. When the materials are sufficiently mixed, the mixing element 35 of the said tool 36 is removed from the tube 11. The mixing tool 36 illustrated in FIG. 3 is exemplary of one that has been successfully used for this purpose.

Other types of mixing tools and/or equipment may also be suitable; however one problem that sometimes arises when attempting to mix certain materials is that they may spill or ooze out of the tube 11 during the mixing operation. Another potential problem, particularly with molten polymers, is that they are very viscous and sticky. So, if a conventional mixing blade, rod, or similar type of mixing element were to be inserted into the tube 11 to mix the material, and then withdrawn after the mixing operation is complete, a large amount of that mixed material would likely stick to the mixing element, and be pulled out of the tube 11 with it.

The mixing tool 36 referenced above solves that problem by incorporating a stripping element 37 into the said tool 36. Whereas, the said mixing element 35 portion of the tool 36 is retractable and extendible through the said stripping element 37 portion of the said tool 36. In use, the mixing tool 36 is typically positioned above the tube 11 with the mixing element 35 retracted until the stripping element 37 comes in close communication with the lip 12 of the tube 11, effectively blocking off the tube 11 opening so no material can escape during mixing. Then, the mixing element 35 is extended into the tube 11 and the mixing tool 36 is rotated by hand to mix the material, all the while keeping the stripping element 37 against the lip 12 of the tube 11 to prevent material from escaping the tube 11 opening. When the mixing operation is complete, the mixing element 35 is then retracted on the tool 36 while still holding the stripping element 37 against the lip 12. This effectively strips substantially all of the material residue from the mixing element 35 as it passes through the said stripping element 37 leaving it inside the tube 11. After the mixing element 35 is fully retracted, the tool 36 can simply be removed from close communication with the tube 11 and set aside.

Detailed alternative embodiments of the mixing tool 36 and related information are disclosed in U.S. Provisional Application Ser. Nos. 61/776,758 and 61/776,765 and 61/776,767 all filed on Mar. 11, 2013, and 61/777,500 filed on Mar. 12, 2013, and 61/801,888 filed on Mar. 15, 2013, and the co-pending U.S. Non-Provisional Applications entitled: Material Stripping Apparatus for External Mixing Element; Mixing Tool with Integrated Material Stripping Element; System and Method for Mixing Polymers and Producing an Injection Molded Part; Injection Tube Assembly with Integrated Material Stripping Element and a Polymer Mixing System for Employing the Same, all filed on the same day as this U.S. Non-Provisional application, all of which are hereby incorporated by reference in their entireties.

In any event, with the material now mixed, and the mixing tool 36 set aside, the user typically removes the injection tube assembly 10 from the support apparatus 48A, either by hand or with the aid of a gripping utensil, and then removably secures the said assembly 10 to a separate apparatus, where some secondary function is performed, such as extruding or injecting molding. However, it shall be appreciated, such an apparatus suitable for this purpose would also be preferably constructed to removably secure and support the particular injection tube assembly 10 being employed with this apparatus 48A, and would typically have its own temperature control means to keep the mixed material at a desired temperature during the said secondary operation.

Figure 4:
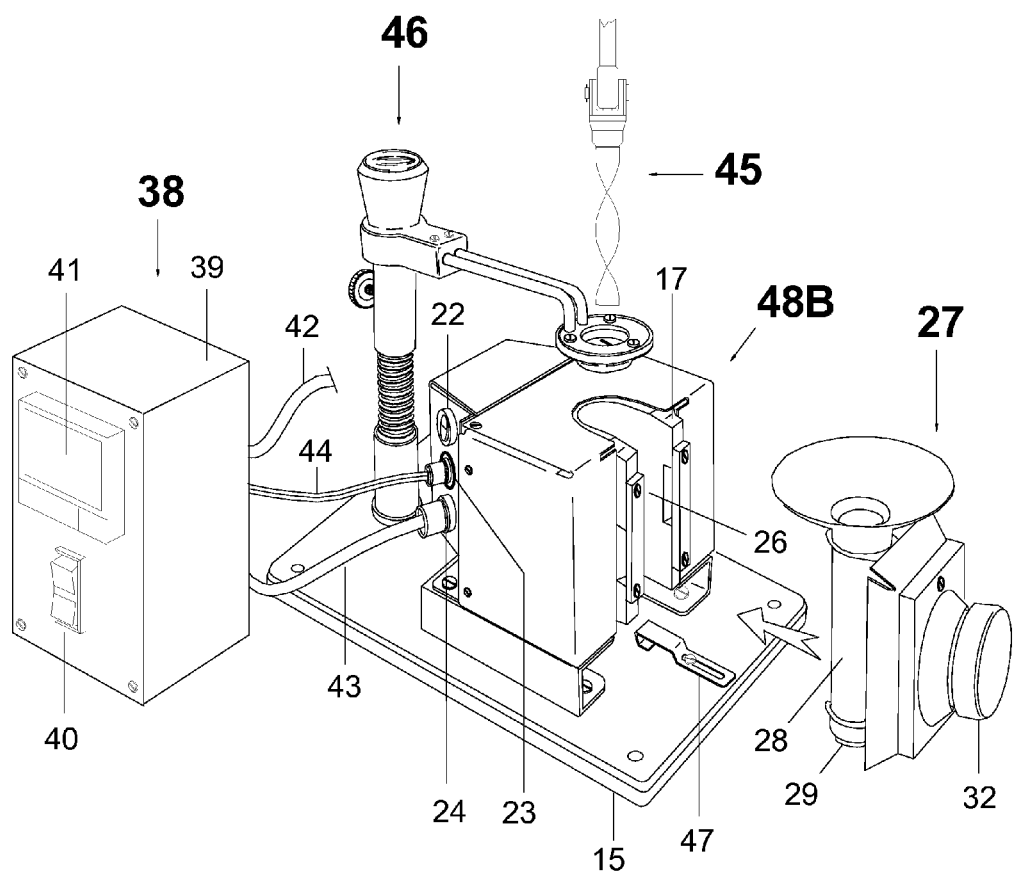
FIG. 4 illustrates an assembled isometric view of a support apparatus in embodiment B.

FIG. 4 illustrates an assembled isometric view of the support apparatus 48B when constructed according to Embodiment B. The basic procedure for operating the apparatus 48B is to first electrically connect the electronic control device (ECD) 38, which supplies and controls the power to the support apparatus 48B. The ECD 38 illustrated in FIG. 4 is exemplary of one that has been successfully used for this purpose and comprises an enclosure 39, a power switch 40, a PID controller with digital temperature display 41, a mains power cord 42, a power output cord 43, a sensor wire 44. It shall be appreciated, electronic control devices of this type are readily available in the marketplace, and details of its construction are not necessary. However, one such ECD 38 that is particularly suitable for integration into the support apparatus 48B is the Model ECB-001 electronic controller manufactured and sold by Galomb, Inc., located in Allentown, Pa., United States.

The power output cord 43 of the ECD 38 connects to a power input receptacle 24 and the sensor wire 44 of the ECD 38 connects the sensor input receptacle 23. After the electrical connections are made to the ECD 38, the mains power cord 42 of the ECD 38 is plugged into an electrical outlet and the power switch 40 is turned on. Likewise the power/circuit breaker switch 22 is turned on. The PID controller 41 is set to a desired temperature, which is typically whatever temperature is necessary to allow the selected materials to be mixed together.

Once the set temperature is reached or before, the injection tube assembly 27 is inserted into the receiving slot 26 of the receiving block 17. The knob 32 of the injection tube assembly 27 is then rotated in a clockwise direction, locking the said assembly 27 in place in the slot 26. Then, if not already previously done the desired material or materials are placed inside the injection tube 28, typically just by pouring them in by hand. When the materials are sufficiently melted or otherwise at the desired temperature, a desired external mixing element may be inserted into the tube 28 to agitate the materials.

The mixing tool 36 previously shown being employed with the apparatus 48A could likewise be employed in the same manner with the apparatus 48B. However, alternatively a mixing apparatus that does not embody an integrated material stripping element 37 may be employed. For example, a helically shaped blade mixing element 45 illustrated in FIG. 4, which in one embodiment is typically attached to a conventional overhead mixing device (not shown), or alternatively to a hand mixing tool (not shown). Whereas, in this alternative embodiment the support apparatus 48 instead cooperates with a material stripping apparatus 46 as illustrated in FIG. 4. The said apparatus 46 is mounted in close proximity to the support apparatus 48B, such as on the base plate 15. Then, with the injection tube assembly 27 already secured in the support apparatus 48B, a repositionable portion the said stripping apparatus 46 is removably positioned over the tube 28 and removably locked in close communication therewith to effectively cover its opening, thus requiring the said element 45 to pass through the said stripping apparatus 46 both when it inserts into the tube 28, and when it's withdrawn, so whatever the material residue is stuck to the said mixing element 45 as it is being withdrawn from the said tube 28 is stripped off by the said stripping apparatus 46, leaving substantially all of it inside the said tube 28.

The material stripping apparatus 46 illustrated in FIG. 4 is exemplary of one that has been successfully used for this purpose. However, detailed alternative embodiments of the material stripping apparatus 46 and related information are also disclosed in U.S. Provisional Application Ser. Nos. 61/776,758 and 61/776,765 and 61/776,767 all filed on Mar. 11, 2013, and 61/777,500 filed on Mar. 12, 2013, and 61/801,888 filed on Mar. 15, 2013, and the co-pending U.S. Non-Provisional Applications entitled: Material Stripping Apparatus for External Mixing Element; Mixing Tool with Integrated Material Stripping Element; System and Method for Mixing Polymers and Producing an Injection Molded Part; Injection Tube Assembly with Integrated Material Stripping Element and a Polymer Mixing System for Employing the Same, all of which are filed on the same day as this U.S. Non-Provisional application, and are hereby incorporated by reference in their respective entireties.

In some instances it may also be desirable to provide a means to prevent lower viscosity materials from escaping through the orifice of the nozzle 29 during the mixing operation. As such, a stopper element 47 may be employed with either embodiment of the support apparatus 48 disclosed herein. As illustrated in FIG. 4, one embodiment of the said stopper element 47 comprises a flat spring bent into a desired shape. The said stopper element 47 typically secures to the base plate 15 with a screw and is positioned directly underneath the nozzle 29 in close communication therewith. The said element 47 has an upward bias to effectively block off the nozzle 29 orifice while the injection tube assembly 27 is secured in the support apparatus 48B, but also has some give to it, allowing it to flex slightly when the injection tube assembly 27 is being inserted and removed from the slot 26.

In any event, after the material is mixed and the mixing element 45 is withdrawn from the tube 28, the user releases the stripping apparatus 46 from close communication with the tube 28, and then typically rotates its repositionable portion away from the tube 28 opening. The user then typically turns the knob 32 in a counterclockwise direction to unlock the injection tube assembly 27 from the receiving block 17, and then removes it entirely from the support apparatus 48B, allowing the said assembly 27 to then be inserted into some external apparatus designed to perform a desired secondary operation with the mixed material, such as an injection molding apparatus.

A detailed description of one such injection molding apparatus that has been successfully used in cooperation with the apparatus 48 is disclosed in U.S. Provisional Application Ser. Nos. 61/776,758 and 61/776,765 and 61/776,767 all filed on Mar. 11, 2013, and 61/777,500 filed on Mar. 12, 2013, and 61/801,888 filed on Mar. 15, 2013, and the co-pending U.S. Non-Provisional Applications entitled: Material Stripping Apparatus for External Mixing Element; Mixing Tool with Integrated Material Stripping Element; System and Method for Mixing Polymers and Producing an Injection Molded Part; Injection Tube Assembly with Integrated Material Stripping Element and a Polymer Mixing System for Employing the Same, all of which are filed on the same day as this U.S. Non-Provisional application, and hereby incorporated by reference in their respective entireties. Additionally, detailed alternative embodiments of the said injection molding apparatus are disclosed in U.S. Pat. Nos. 8,070,469 and 7,494,332 and D559,285 along with their preceding provisional applications and continuations extending therefrom. All of which are incorporated herein by reference in their respective entireties.

Purpose and Some Advantages

The support apparatus 48 removably secures and supports a predetermined vessel, preferably an injection tube assembly 10, 27, in a desired orientation, namely vertically, as well as controls the temperature of said assembly 10, 27 when it's secured in the apparatus 48. The apparatus 48 facilitates the mixing of materials, preferably polymers, contained in the injection tube 11, 28 portion of the said assembly 10, 27. In one embodiment, the apparatus 48 is employed in cooperation with a mixing tool 36 comprising a mixing element 35 and an integrated material stripping element 37, whereby the mixing element 35 portion of the said tool 36 mixes the material in the tube 11, 28 and then the material stripping element 37 portion of the said tool 36 strips material residue from the mixing element portion 35 of the said tool 36 as it is withdrawn from the said tube 11, 28, leaving substantially all of the material residue inside the said tube 11, 28.

In another embodiment, the apparatus 48 is employed in cooperation with a material stripping apparatus 46, whereby in this embodiment, a separate external mixing element 45 mixes the material in the tube 11, 28, and then the stripping apparatus 46 strips the material residue from the said external mixing element 45, as it is withdrawn from the said tube 11, 28, leaving substantially all of the material residue inside the said tube 11, 28.

If desired, the apparatus 48 may also comprise a stopper element 47 removably positionable in close communication with the nozzle 13, 29 portion of the injection tube assembly 10, 27 to effectively block off its orifice and prevent material from escaping as it is being mixed in the tube 11, 28.

If desired, the apparatus 48 in either embodiment may also be employed in cooperation with an injection molding apparatus, such as the type disclosed by reference above, to perform a desired secondary function with the mixed material, such as producing an injection molded part.

Some Advantages, without Limitation:

Facilitating the mixing of polymers by providing a support apparatus 48 that enables the injection tube assembly 10, 27 to be removed therefrom within seconds after the material is mixed, thereby allowing a secondary external operation to be performed with the said mixed material before degradation, solidification, or curing of the material occurs.

Facilitating the mixing of polymers by controlling the temperature of the injection tube 11, 28 when it's secured in the apparatus 48, and therefore the materials placed inside it, by controlling the temperature of its surrounding environment, namely the receiving block 3, 17 to which the injection tube assembly 10, 27 is positioned in close communication therewith and removably secured thereto.

Facilitating the mixing of polymers by removably securing and supporting the injection tube 11, 28 in a vertical orientation, thereby helping to prevent material placed inside the said tube 11, 28 from escaping.

Facilitating the mixing of polymers by removably securing and supporting the injection tube assembly 10, 27 in a desired position, namely raised up from the base plate 1, 15 on a mounting platform 2, 16, thereby providing unobstructed access underneath the said tube assembly 10, 27, for the employment of a stopper element 47. The said raised up mounting platform 2, 16 also serves to minimize heat transfer to the base plate 1, 15.

Facilitating the mixing of polymers by preventing material from escaping through the nozzle 13, 29 orifice during the mixing operation. For example, by removably positioning a stopper element 47 underneath the said nozzle 13, 29 in close communication therewith to close off the said orifice.

Facilitating the mixing of polymers by preventing the injection tube 11, 28 from rotating or otherwise become dislodged when the materials inside it are being mixed, for example, by removably interlocking the block 17 and the assembly 27 together.

Facilitating the mixing of polymers by providing unobstructed access to the injection tube 11, 28 from above when the injection tube assembly 10, 27 is removably secured in the apparatus 48, thereby allowing both a stripping apparatus 46 and an external mixing element 45 to be employed in combination, or alternatively thereby allowing a mixing tool 36 to be employed.

Facilitating the mixing of polymers by providing unobstructed access to the injection tube 11, 28 from above when the injection tube assembly 10, 27 is removably secured in the apparatus 48, thereby allowing the stripping apparatus 46 to be removably positioned in close communication with the injection tube 11, 28 and cover its top opening to prevent materials from escaping the said tube 11, 28 during the mixing operation.

Facilitating the mixing of polymers by providing unobstructed access to the injection tube 11, 28 from above when the injection tube assembly 10, 27 is removably secured in the apparatus 48, thereby allowing the stripping apparatus 46 to be removably positioned in close communication with the injection tube 11, 28 and cover its top opening to prevent materials from escaping the said tube 11, 28 during the material stripping operation.

Facilitating the mixing of polymers by providing unobstructed access to the injection tube 11, 28 from above when the injection tube assembly 10, 27 is removably secured in the apparatus 48, thereby allowing the stripping apparatus 46 to be removably positioned in close communication with the injection tube 11, 28 to effectively strip material residue from a desired external mixing element (e.g. 45) as it is being withdrawn from the said tube 11, 28.

Facilitating the mixing of polymers by providing unobstructed access to the injection tube 11, 28 from above when the injection tube assembly 10, 27 is removably secured in the apparatus 48, thereby allowing the stripping apparatus 46 to be removably positioned in close communication with the injection tube 11, 28 to effectively prevent the said tube 11, 28 from becoming dislodged from its position during the mixing operation and/or the stripping operation.

Facilitating the mixing of polymers by providing unobstructed access to the injection tube 11, 28 from above when the injection tube assembly 10, 27 is removably secured in the apparatus 48, thereby allowing the stripping element 37 of the tool 36 to be removably positioned in close communication with the injection tube 11, 28 to effectively cover its top opening and prevent materials from escaping the said tube 11, 28 during the mixing operation.

Facilitating the mixing of polymers by providing unobstructed access to the injection tube 11, 28 from above when the injection tube assembly 10, 27 is removably secured in the apparatus 48, thereby allowing the stripping element 37 of the tool 36 to be removably positioned in close communication with the injection tube 11, 28 to cover its top opening and effectively strip material residue from the mixing element 35 portion of the tool 36 as it is being withdrawn from the said tube 11, 28.

Facilitating the mixing of polymers by providing unobstructed access to the injection tube 11, 28 from above when the injection tube assembly 10, 27 is removably secured in the apparatus 48, thereby allowing the stripping element 37 of the tool 36 to be removably positioned in close communication with the injection tube 11, 28 to cover its top opening and effectively prevent the said tube 11, 28 from becoming dislodged from its position during the mixing operation and/or the stripping operation.

It shall be appreciated; the apparatus 48 is not limited to the above advantages. Also, not all of the recited advantages must be present simultaneously for the apparatus 48 to function as intended.

Some Alternative Embodiments, without Limitation

It shall be apparent from reading the specification that the support apparatus 48 may be constructed in multiple alternative embodiments without departing from the spirit of the invention. For example, as disclosed in Embodiment A, the support apparatus 48A may comprise a relatively simple power and temperature control means integrated into the unit itself. Or, as disclosed in Embodiment B, the apparatus 48B may comprise a more sophisticated and separately housed power and temperature control means.

It shall also be apparent from reading the specification that the support apparatus 48 may be constructed to accommodate alternative injection tube assemblies 10, 27 without departing from the spirit of the invention. For example, as described in Embodiment A, the apparatus 48A may accommodate a relatively simple injection tube assembly 10 comprising an injection tube 11 and a nozzle 13. Or, as described in Embodiment B, the apparatus 48B may accommodate a more complex injection tube assembly 27 comprising an integrated latching mechanism 31, a knob 32, a funnel tray 30, a nozzle 29, and an injection tube 28.

However, it shall be appreciated; the two embodiments 48A and 48B described herein are not the only possibilities, and many other embodiments are possible within the teachings of the invention. Indeed, the said Apparatus 48 may be constructed to accommodate multiple types of predetermined vessels simultaneously without departing from the spirit of the invention. For example, the said apparatus 48 may accommodate a range of injection tube assemblies (e.g. 10, 27), all with a similar external configuration suitable to fit into the slot 26 or alternatively the hole 9 of the apparatus 48, but each with a different material holding capacity, or a different nozzle 29 orifice size, or some other distinguishing attribute, such as one assembly (e.g. 10, 27) comprising a disposable, single-use injection tube (e.g. 11, 28) and another comprising a re-usable injection tube (e.g. 11, 28).

It shall also be apparent from reading the specification that the elements comprising the support apparatus 48 may have alternative constructions, from those already described in embodiments A and B, without departing from the spirit of the invention. For example, in order to reduce manufacturing costs and/or improve assembly efficiency, the base plate 1 and the mounting platform 2 of Embodiment 48A could alternatively be prefabricated as a unified support structure (not shown), serving as both the base plate 1 and the mounting platform 2. Likewise in Embodiment 48B, the base plate 15 and the mounting platform 16 could alternatively be prefabricated as a unified support structure (not shown), serving as both the base plate 15 and mounting platform 16.

Another example is the receiving block 3 and the heating element 4 of Embodiment 48A, which could alternatively be fabricated together as a single element (not shown), whereas the said heating element 4 is casted directly into the said receiving block 3 during fabrication.

Still another example, without limitation is also in Embodiment 48B, where the protective shroud 21, back wall support 20 and protective enclosure 19 could alternatively be prefabricated together as a unified protective enclosure (not shown), and attach directly to the support platform 16.

Lastly, it shall be apparent from reading the specification that other embodiments of the apparatus 48 are contemplated even though not particularly described herein. For example, without limitation, the apparatus 48 may comprise a means to cool the injection tube assembly 10, 27 as well as a means to heat it in order to control its temperature.

What is claimed is:

1. A support apparatus that removably secures an injection tube assembly in a vertical orientation, employed in cooperation with a material stripping apparatus, the support apparatus comprising: a support structure including a base plate, a mounting platform and a stationary receiving block; at least one heating element; a power control; a temperature control; and a protective enclosure, wherein the injection tube assembly comprises at least a hollow cylindrical tube and a nozzle with an orifice, and wherein the nozzle orifice is closed-off when the injection tube assembly is removably secured in the apparatus.

2. The apparatus of claim 1, wherein the receiving block is characterized by a through hole to receive the injection tube assembly.

3. The apparatus of claim 1, wherein the receiving block is characterized by a slot to receive the injection tube assembly.

4. The apparatus of claim 1, further comprising a stopper element, positionable in close communication with the injection tube assembly.

5. The apparatus of claim 1, wherein unobstructed access is provided to the injection tube assembly from above when secured therein.

6. The apparatus of claim 1, wherein unobstructed access is provided to the injection tube assembly from below when secured therein.

7. The apparatus of claim 1, further employed in cooperation with a mixing apparatus.

8. The apparatus of claim 7, wherein the mixing apparatus comprises a helically shaped ribbon as a mixing element.

9. The apparatus of claim 1, further employed in cooperation with an injection molding apparatus.

10. A support apparatus that removably secures an injection tube assembly in a vertical orientation, employed in cooperation with a tool comprising a mixing element and a material stripping element, the support apparatus comprising: a support structure including a base plate, a mounting platform and a stationary receiving block; at least one heating element; a power control; a temperature control; and a protective enclosure.

11. The apparatus of claim 10, wherein the receiving block is characterized by a through hole to receive the injection tube assembly.

12. The apparatus of claim 10, wherein the receiving block is characterized by a slot to receive the injection tube assembly.

13. The apparatus of claim 10, wherein the injection tube assembly comprises at least a hollow cylindrical tube and a nozzle with an orifice.

14. The apparatus of claim 13, wherein the nozzle orifice is closed-off when the injection tube assembly is removably secured in the support apparatus.

15. The apparatus of claim 10, further comprising a stopper element, positionable in close communication with the injection tube assembly.

16. The apparatus of claim 10, wherein unobstructed access is provided to the injection tube assembly from above when secured therein.

17. The apparatus of claim 10, wherein unobstructed access is provided to the injection tube assembly from below when secured therein.

18. The apparatus of claim 10, further employed in cooperation with an injection molding apparatus.

\* \* \* \* \*